US 6,749,680 B1

United States Patent
von Fay et al.

(10) Patent No.: US 6,749,680 B1
(45) Date of Patent: Jun. 15, 2004

(54) THIN CONCRETE REPAIR SYSTEM

(75) Inventors: Kurt F. von Fay, Littleton, CO (US); William F. Kepler, Golden, CO (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/660,482

(22) Filed: Sep. 12, 2000

(51) Int. Cl.$^7$ .............................................. C04B 14/06
(52) U.S. Cl. ..................... 106/644; 106/690; 106/691; 106/692; 106/737; 106/823
(58) Field of Search ................ 106/644, 690, 106/691, 692, 737, 823

(56) References Cited

U.S. PATENT DOCUMENTS

| | | | | |
|---|---|---|---|---|
| 4,038,094 A | * | 7/1977 | Bondi ........................ | 106/99 |
| 4,513,040 A | * | 4/1985 | Lankard ..................... | 52/612 |
| 4,755,227 A | * | 7/1988 | Sherif et al. ................. | 106/85 |
| 5,002,610 A | * | 3/1991 | Sherif et al. ................. | 106/691 |
| 5,114,487 A | * | 5/1992 | Gartshore et al. ........... | 106/695 |
| 5,185,039 A | * | 2/1993 | Hamaguchi et al. ........ | 106/728 |
| 5,536,310 A | * | 7/1996 | Brook et al. ................. | 106/708 |
| 5,556,458 A | * | 9/1996 | Brook et al. ................. | 106/708 |
| 5,718,759 A | * | 2/1998 | Stav et al. ................... | 106/735 |
| 5,858,083 A | * | 1/1999 | Stav et al. ................... | 106/735 |
| 6,149,724 A | * | 11/2000 | Ulibarri et al. ............. | 106/693 |

FOREIGN PATENT DOCUMENTS

EP          0384898       *   8/1990

OTHER PUBLICATIONS

"Utilization of Recycled Materials in Illinois Highway Construction—Fly Ash" Pavement Technology; US Dept. of Transportation, Fed. Highway Adm. (No date available).*

* cited by examiner

Primary Examiner—Paul Marcantoni
(74) Attorney, Agent, or Firm—Ross F. Hunt, Jr.

(57) ABSTRACT

A cement repair material composition is provided for repairing thin concrete. The composition comprises, in weight percentages: fine aggregates, 50–80%; cement, 10–20%, said cement being selected from the group consisting of expansive hydraulic cement, gypsum cement, and magnesium phosphate cement; reinforcing fibers such as polyethylene, steel and fiberglass fibers, 1–5%; and a first water-reducing chemical additive, and a second shrinkage compensating chemical additive, a combined 0.01 to 5%.

8 Claims, No Drawings

THIN CONCRETE REPAIR SYSTEM

BACKGROUND OF THE INVENTION

1. Field of the Invention

The present invention relates to repair materials for concrete, and more particularly, to improved concrete repair materials containing cement, reinforcing fibers, and chemical additives.

2. Related Art

Concrete structures and surfaces often develop cracks from environmental stresses, load stresses, and shrinkage during curing. For functional and/or aesthetic reasons, it is often desirable to repair these cracks. However, current repair systems are often considered temporary and suffer from problems including thermal incompatibility with the parent concrete, and re-cracking. More specifically, conventional thin concrete repair materials and systems are generally polymer-based or cementitious materials-based. Unfortunately, many of these systems fail after only a few years of service. Polymer-based systems do not generally perform well in an outdoor environment because of the thermal incompatibility of such systems with concrete, and frequently de-bond after a few years of exposure. Many cementitious systems have also been examined and have been found to not perform adequately. In this regard, many repairs using these materials crack or become de-bonded after exposure to actual field conditions, or deteriorate from other environmental causes, thereby leading to premature failure of the repair.

SUMMARY OF THE INVENTION

According to the invention, there is provided an improved concrete repair material which provides a number of advantages over the prior art particularly with respect to making repairs to thin surface defects in concrete structures located in outside environments. The repair material of the invention is less prone to cracking during hydration and, although of particular value in outdoor environments, is suitable for repairing concrete in both indoor and outdoor applications.

In accordance with the invention, a cement repair material composition comprising in weight percentages fine aggregates, 50–80%; cement 10–20%, said cement being selected from the group consisting of expansive hydraulic cement, gypsum cement, and magnesium phosphate cement; reinforcing fibers 1–5%; and a first water-reducing chemical additive and a second shrinkage compensating chemical additive, 0.01 to 5%.

Preferably, the reinforcing fibers are selected from the group consisting of polyethylene fibers, steel fibers, and fiberglass fibers.

In an advantageous implementation, the first chemical additive is selected from the group consisting of water-reducing admixtures, retarding admixtures, water-reducing retarding admixtures, water-reducing high-range admixtures, and water-reducing high-range retarding admixtures.

Preferably, the second chemical additive comprises a drying shrinkage reducing admixture.

Advantageously, the cement repair material composition further comprises a mineral admixture. The mineral admixture is preferably selected from the group consisting of coal ash, calcined natural pozzolan, and silica fume. Advantageously, the mineral admixture is present in an amount by weight from 0% to 3.5%.

In a further preferred embodiment of the cement repair material composition of the invention the fine aggregates are present in an amount by weight from 60% to 80%; the cement is present in an amount by weight from 15% to 18%; the first chemical additive is present in an amount by weight from 0.005% to 0.05%; and the second chemical additive is present in an amount by weight from 0.005% to 0.05%.

Other objects, features, and advantages of the present invention will be set forth in, or will become apparent from, the detailed description of the preferred embodiments of the invention which follows.

DESCRIPTION OF THE PREFERRED EMBODIMENTS

As indicated above, according to the invention, there is provided a cement mixture for repairing cracks in concrete. The mixture is formulated to allow for rapid strength gain and to be thermally compatible with the parent concrete. As explained below, reinforcing fibers and special chemical additives prevent the cracking that is typical of most cementitious repair materials.

The type of cement used is chosen based on the application environment of the repair material. The American Society for Testing and Materials (ASTM) has created standards for a variety of materials, including cement, aggregates, and mineral admixtures. The standards specify acceptable compositions and physical properties for a given material. The ASTM also classifies the materials into various types meeting a particular standard.

Expansive hydraulic cements are divided into three types based on chemical composition. Type K is an expansive hydraulic cement containing anhydrous calcium aluminosulfate, calcium sulfate, and calcium oxide. Type M is an expansive hydraulic cement containing calcium aluminate cement and calcium sulfate. Type S is an expansive hydraulic cement containing tricalcium aluminate and calcium sulfate. ASTM C-845 is the standard specification for hydraulic cement.

For normal application conditions where rapid strength gain is not important, Type K expansive hydraulic cement is suitable for use in the repair material. For normal placement conditions when rapid strength gain is important a blended hydraulic cement or gypsum cement is used. A blended expansive hydraulic cement can also be used which comprises a mixture of two or more types of expansive hydraulic cement and meets ASTM C-845. Further, a gypsum cement can be used which meets ASTM C-28 for gypsum plasters or ASTM C-317 for gypsum concrete. Magnesium phosphate cement is incorporated in the repair mixture when rapid strength gain is important and placement conditions are either relatively hot or cold.

Reinforcing fibers are utilized in the repair mixture to prevent the formation of micro-cracks. The fiber material is chosen based on the application conditions and preferably comprises fibers selected from the group consisting of polyethylene, steel, and fiberglass fibers.

As indicated above, the repair material also includes a first chemical admixture. ASTM C 494 is a standard specification for concrete chemical admixtures. ASTM chemical admixtures are divided into seven types. Type A are water-reducing admixtures, Type B comprise retarding admixtures, Type C comprise accelerating admixtures, Type D comprise water reducing retarding admixtures, Type E comprise water-reducing high-range admixtures, and Type F comprise water-reducing high-range retarding admixtures. The first chemical admixture of the concrete repair material of the invention meets ASTM C 494 and, preferably, is a Type F or Type G admixture.

The second chemical additive is a commercially available drying shrinkage reducing admixture. Conventional concrete will shrink during drying and cause the formation of cracks. Commercially available shrinkage reducing admixtures have been developed combat this problem and the concrete repair material of the invention preferably includes one of these admixtures.

ASTM C 618 is a standard specification for coal ash and raw or calcined natural pozzolam for use as mineral admixtures in concrete. ASTM C 1240 is a standard specification for silica fume for use as a mineral admixture in hydraulic cement concrete, mortar, and grout. One or more optional mineral admixtures can be used in the repair material and are preferably selected from those meeting ASTM C 618 or ASTM C 1240.

EXAMPLE I

In this example, and in the one that follows, only one of the three cement types will be used in the formulation, depending on the intended use and application. The specific formulation for this example is as follows.

| Material | Percentage by Weight |
| --- | --- |
| Fine aggregate | 78.0% |
| Cement | 15.0% |
| Fibers | 1.0% |
| HRWRA[1] | 0.005% |
| DSRA[2] | 0.005% |
| Mineral Admixture | 0.0% |
| Silica Fume | 0.0% |
| Water | 6.0% |
| Total | 100.0% |

[1]HRWRA refers to high rate water reducing additive.
[2]DSRA refers to drying shrinkage reducing additive.

EXAMPLE II

In a second example, the specific formulation is as follows:

| Material | Percentages by Weight |
| --- | --- |
| Fine aggregate | 61.7% |
| Cement | 18.0% |
| Fibers | 5.0% |
| HRWRA | 0.05% |
| DSRA | 0.05% |
| Mineral Admixture | 3.5% |
| Silica Fume | 2.6% |
| Water | 9.1% |
| Total | 100.0% |

Although the invention has been described above in relation to preferred embodiments thereof, it will be understood by those skilled in the art that variations and modifications can be effected in these preferred embodiments without departing from the scope and spirit of the invention.

We claim:

1. A cement repair material composition for thin concrete, said composition comprising in weight percentages:

sand, 50–80%;
cement, 10–20%, said cement being selected from the group consisting of expansive hydraulic cement, gypsum cement, and magnesium phosphate cement;
reinforcing fibers, 1–5%; and
a first chemical additive selected from the group consisting of water-reducing admixtures, set retarding admixtures, water-reducing set retarding admixtures, water-reducing high-range admixtures, and water-reducing high-range set retarding admixtures, and a second shrinkage compensating chemical additive comprising a drying shrinkage reducing admixture, 0.01 to 5%.

2. The cement repair material composition according to claim 1, wherein said reinforcing fibers are selected from the group consisting of polyethylene fibers, steel fibers, and fiberglass fibers.

3. The cement repair material composition according to claim 1, further comprising a mineral admixture different from said fine aggregate.

4. The cement repair material composition according to claim 3, wherein said mineral admixture is selected from the group consisting of coal ash, calcined natural pozzolan, and silica fume.

5. The cement repair material composition according to claim 4, wherein said mineral admixture is present in an amount by weight from 0% to 3.5%.

6. The cement repair material composition according to claim 1, wherein said fine aggregates are present in an amount by weight from 60% to 80%;
said cement is present in an amount by weight from 15% to 18%;
said first chemical additive is present in an amount from 0.005% to 0.05%; and
said second chemical additive is present in an amount from 0.005% to 0.05%.

7. A cement repair material composition for thin concrete, said composition comprising, in percentage by weight:

| | |
| --- | --- |
| sand | 78.0% |
| cement | 15.0% |
| fibers | 1.0% |
| high rate water reducing additive | 0.005% |
| drying shrinkage reducing additive | 0.005% |
| mineral admixture | 0.0% |
| silica fume | 0.0% |
| water | 6.0%. |

8. A cement repair material composition for thin concrete, said composition comprising, in percentage by weight:

| | |
| --- | --- |
| sand | 61.7% |
| cement | 18.0% |
| fibers | 5.0% |
| high rate water reducing additive | 0.05% |
| drying shrinkage reducing additive | 0.05% |
| mineral admixture | 3.5% |
| silica fume | 2.6% |
| water | 9.1%. |

* * * * *